Sept. 18, 1962 H. R. SCHELP 3,054,257
GAS TURBINE POWER PLANT FOR VEHICLES
Filed March 10, 1953

HELMUT R. SCHELP,
INVENTOR.

BY John H.J. Wallace

United States Patent Office 3,054,257
Patented Sept. 18, 1962

3,054,257
GAS TURBINE POWER PLANT FOR VEHICLES
Helmut R. Schelp, Pacific Palisades, Calif., assignor to The Garrett Corporation, a corporation of California
Filed Mar. 10, 1953, Ser. No. 341,480
3 Claims. (Cl. 60—39.17)

The present invention relates generally to a turbine power plant and particularly to a gas turbine power plant that may be utilized as a vehicle drive. While the invention is particularly applicable to a vehicle drive, it is to be understood that the device would be equally suitable for use as a drive for any type of power consuming machinery wherein variable loads are encountered.

The basic disadvantage of former gas turbines, operating under variable load conditions, has been the comparatively very high specific fuel consumption. In many fields of application, this disadvantage is a primary limiting factor when utilizing this type of prime mover. Many solutions for this problem of high specific fuel consumption have been suggested in the past which, if correctly applied, alleviated the disadvantage under full load conditions, but failed to provide a satisfactory answer for a gas turbine power plant operating under partial load conditions.

It is therefore an object of the present invention to provide a gas turbine power plant having a novel thermodynamic cycle for effectively reducing the specific fuel consumption thereof at all conditions including the partial load range.

It is another object of the present invention to provide a novel arrangement of components in a gas turbine power plant wherein novel means are provided for conserving the enthalpy of compressed air being utilized to support combustion therein.

A further object of the invention is to provide a novel means for controlling torque delivered from a gas turbine power plant, thus providing smooth throttling characteristics.

A still further object of the invention is to provide a novel gas turbine power plant wherein relatively cool compressed air is initially conducted in heat exchange relationship with hot exhaust gases from a pair of gas turbines, one of said gas turbines normally operating at constant speed and being utilized to drive a compressor, the other gas turbine being of the so-called floating type and having a power take-off therefrom.

Figure 1:
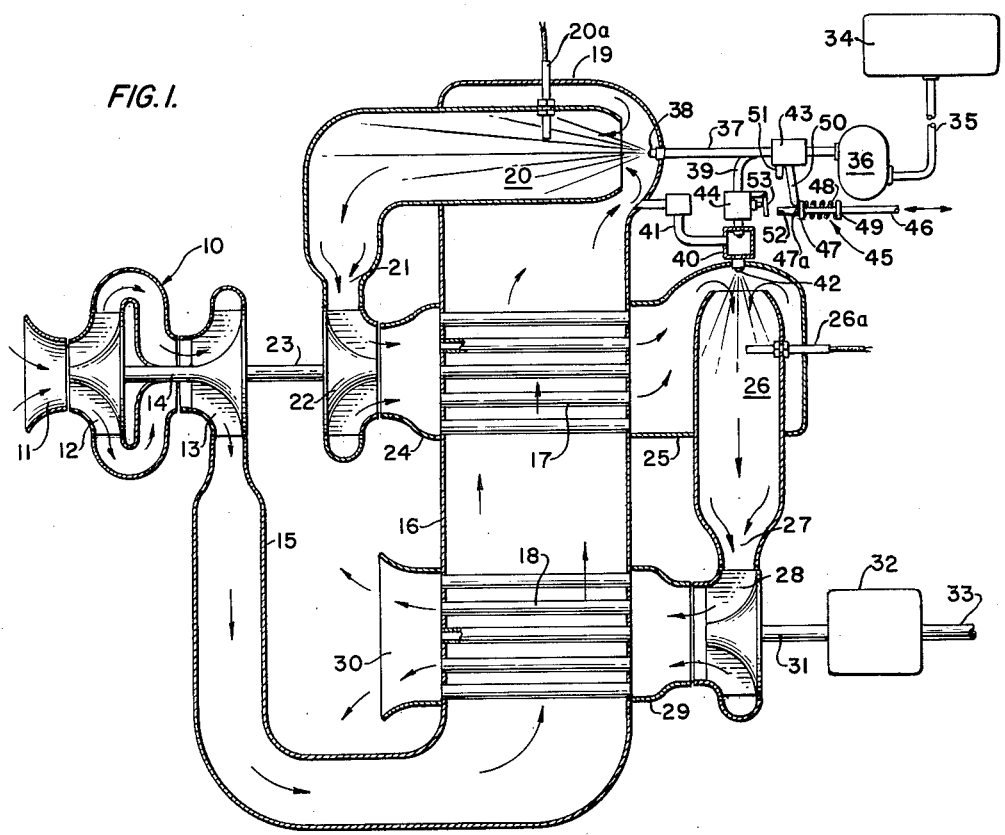
Figure 2:
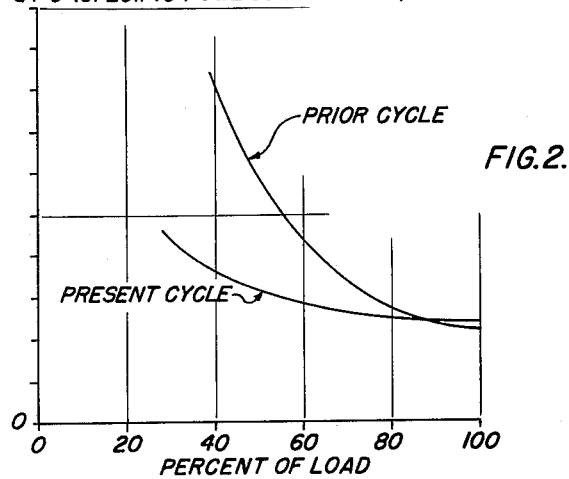

Other and further important objects of the invention will become apparent from the disclosures in the following detail description, appended claims, and accompanying drawing, wherein:

FIG. 1 is a diagrammatic view showing the arrangement of components and the system utilized in the gas turbine power plant of the present invention; and FIG. 2 is a graph showing a comparison between the specific fuel consumption between the present and known types of gas turbine power plants under varying load conditions.

Referring primarily to FIG. 1 of the drawing, the gas turbine power plant of the present invention is shown as comprising a compressor 10 having an inlet 11 to a plurality of compression stages formed by radial outward flow compressor wheels 12 and 13 interconnected by means of a shaft 14. Compressed air discharged from the compressor 10 is conducted through a conduit 15 and into an enlarged conduit 16, conduits 15 and 16 providing primary passage means for the compressed air.

The conduit 16 has a primary heat exchanger 17 and a secondary heat exchanger 18 positioned therein, the secondary heat exchanger 18 being arranged upstream from the primary heat exchanger 17. The conduit 16 is also provided with a closed end portion 19 which communicates with a primary combustion chamber 20 which may be provided with suitable ignition means such as a glow plug 20a or the like. The discharge from said combustion chamber 20 is conducted to a suitable scroll 21 of a primary turbine 22. The turbine 22 is adapted to be connected to and to drive the compressor 10 through a shaft 23.

Hot gases discharged from the turbine 22 are conducted through a passage 24 and through the heat exchanger 17, in regenerative heat exchange with compressed air in the conduit 16. An extension 25, of the passage 24, is adapted to conduct motive fluid discharged from the heat exchanger 17 to a secondary combustion chamber 26 which may also be provided with suitable ignition means such as a glow plug 26a or the like. The discharge from the combustion chamber 26 is delivered to a scroll 27, to thereafter be received by and to drive a floating secondary turbine 28. The hot exhaust gas from the turbine 28 is conducted through a passage 29, through the secondary heat exchanger 18, in additional regenerative heat exchange with the compressed air in the conduit 16, and out to atmosphere by means of a discharge passage 30.

The wheel of the turbine 28 is operatively connected to a shaft 31 which extends to a suitable transmission 32 from which a shaft 33 extends, for the delivery of power to any suitable power consumer.

The combustion chambers 20 and 26 are supplied with suitable fuel under pressure, from a tank 34. Fuel from the tank is conducted through a conduit 35 to a fuel pump 36 and from the fuel pump through a conduit 37 and a nozzle 38 to the combustion chamber 20. The branch conduit 39 conducts fuel from the conduit 37 to an air-fuel pre-mixing chamber 40 wherein, as by aspiration, there is mixed with the fuel, air bled by means of a conduit 41 from the duct 16 at a point downstream of the heat exchanger 17, as shown. From the pre-mixing chamber 40, the air-fuel mixture is directed through a nozzle 42 and into the combustion chamber 26.

Fuel control valves 43 and 44 are positioned in the conduits 37 and 39 respectively, these valves being under control of any suitable throttle linkage mechanism, indicated generally at 45. Mechanism 45, for example, comprises a reciprocable throttle control rod 46 having thereon a washer 47, this washer being normally urged against a stop pin 47a carried by the rod 46, by means of a compression spring 48, the other end of the spring engaging a collar 49 affixed to the rod. The washer 48 is arranged to engage a valve operating lever 50 extending from and adapted to variably control the valve 43. A stop 51, carried by the valve 43, limits movement of the arm 50, the construction being such that when the arm 50 engages the stop 51, the washer 47 will slide on the rod 46. As the arm 50 engages the stop 51, the end 52 of the rod 46 is adapted to simultaneously engage an operating lever 53 carried by and adapted to open the valve 44. The action of this overtravel mechanism is such as to permit fuel flow to the pre-mixing chamber 40, only after the valve 43, and associated delivery of fuel to the combustion chamber 20, is in the full open position, the purpose of which will be later described.

In the operation of the invention, compressed air is delivered from the compressor 10 through the ducts 15 and 16 and over the tubes of the heat exchangers 17 and 18, wherein the compressed air is initially heated by passage in heat exchange relationship with the hot exhaust gases from the turbines 22 and 28. The heated compressed air is next mixed with fuel from the nozzle 38, the mixture is burned in the combustion chamber 20 and is thereafter delivered to drive the turbine 22. The hot gases are expanded in the turbine 22 where energy required to drive the compressor 10 is extracted. The hot gases emitting from the turbine 22 are then utilized to preheat the compressed air in the conduit 16 before it enters the combustion chamber 20. After leaving the heat exchanger 17, the exhaust gases, still under a pressure considerably higher than the ambient atmospheric pressure, are introduced into the secondary combustion chamber 26 where fuel is again injected, by means of the nozzle 42, in order to reheat these gases. For complete combustion in the combustion chamber 26, thorough atomization and partial or complete vaporization of the fuel, a desirably small amount of compressed air is bled from any suitable source, as from the conduit 16 through the conduit 41, for pre-mixing in the chamber 40, thereby insuring uniform ignition and combustion of all the fuel-air mixture being delivered to this secondary combustion chamber. Air flow through the conduit 41 is under control of a valve 44 which permits only aspirated flow of air therethrough, thus serving to shut off flow to the chamber 40 when fuel is not being introduced into the combustion chamber 26.

The hot gases from the combustion chamber 26 are delivered to and expanded in the turbine 28 to produce shaft horsepower for ultimate delivery to any suitable power consumer. The exhaust, leaving the turbine 28, is conducted through the tubes of the secondary heat exchanger 18 and is thereafter discharged to atmosphere, the waste heat contained in these exhaust products being utilized to additionally preheat the compressed air leaving the compressor 10.

It is a well-known fact that the economy of a simple, open-cycle gas turbine is best when it is operating under full load, but such economy falls off rapidly with a decline in load. It will be seen that, through use of the heat exchangers 17 and 18, the throttling mechanism 45 and valves 43 and 44, the thermodynamic cycle presently obtained is very advantageous when full power is not required from output shaft 33 of the turbine 28. Under such conditions the power plant is throttled by decreasing the amount of fuel that is injected into the secondary combustion chamber 26 without throttling the amount of fuel delivered to the primary combustion chamber 20.

During full load operation, more heat is transferred to the compressed air in the duct 16 by heat exchange with the exhaust gases from the turbines 22 and 28 in the heat exchangers 17 and 18. During partial load conditions, i.e., when a reduced amount of fuel is being injected into the combustion chamber 26, most of the preheating of the compressed air is accomplished in the heat exchanger 17, utilizing the heat contained in the exhaust gases from the turbine 22.

A comparison of the specific fuel consumption obtained by the present device, with that obtained by similar prior devices, is shown in FIG. 2. In this graph, it may be seen that at 100% load there is but a slight difference in the fuel consumption between present and prior devices, however, at 40% load, for example, prior devices had a specific fuel consumption more than twice that of the present power plant.

Without the application of a torque converter, the present power plant has approximately the same torque as an equivalent conventional reciprocating internal combustion engine with a torque converter, in other words, a torque ratio between idling and operating speeds of approximately 2.5 to 1 is obtained. Torque converters used in conjunction with a reciprocating engine having the disadvantage that the braking power of the engine is very low and much heavier brakes must be used on any vehicle driven by such engines. By utilization of a reversing nozzle intermediate the scroll 27 and the turbine 28, the present power plant may be utilized for both braking power and reverse operation. In this instance, the wheel of the turbine 28 may be conveniently and preferably a full centripetal or 90° radial inflow type.

Having thus described the invention and the present embodiment thereof, it is desired to emphasize the fact that many modifications may be resorted to without departing from the spirit and scope of the invention.

I claim:

1. A gas turbine power plant comprising: a primary compressor, a primary turbine adapted to drive said compressor; a secondary turbine having power takeoff means; first and second combustor means associated with said primary and secondary turbines respectively; passage means for conducting compressed oxidant bearing fluid from said compressor consecutively through said primary turbine, in regenerative heat exchange with itself, through said secondary turbine and in additional regenerative heat exchange with itself; and means forming a part of a fuel supply apparatus for said second combustor for controlling the torque delivered to said power takeoff by said secondary turbine.

2. A gas turbine power plant comprising: a primary compressor; a primary turbine adapted to drive said compressor; a secondary turbine arranged in pneumatic series with said primary turbine; a power takeoff from said secondary turbine; passage means for conducting compressed oxidant bearing fluid from said compressor to said primary turbine; means associated with each of said turbines for independently increasing the enthalpy of motive fluid at the entrances thereof; and independent heat exchange means in said passage means for conducting said compressed oxidant bearing fluid in regenerative heat exchange relationship with the exhausts of each of said turbines, said heat exchange means associated with the exhaust of said secondary turbine, being upstream from said heat exchange means associated with said exhaust of said primary turbine.

3. A gas turbine power plant as described in claim 2 wherein said passage means for conducting compressed oxidant bearing fluid from said compressor to said primary turbine comprises a primary passage, wherein said gas turbine power plant includes a secondary passage for conducting discharge from said primary turbine to said secondary turbine, and a discharge passage leading from said secondary turbine; wherein said means associated with each of said turbines for independently increasing the enthalpy of motive fluid at the entrances thereof includes primary and secondary combustion chambers associated respectively with said primary and secondary turbines and positioned, respectively, in said primary and secondary passages immediately upstream from said turbines, and further includes means for supplying a combustible fuel to said combustion chambers with fuel being delivered to said secondary combustion chamber subsequent to maximum delivery of fuel to said primary combustion chamber; and wherein said independent heat exchange means includes a primary heat exchanger positioned at a junction of said primary passage and said secondary passage and a secondary heat exchanger positioned at a junction of said primary passage and said discharge passage.

References Cited in the file of this patent

UNITED STATES PATENTS

| 2,078,957 | Lysholm | May 4, 1937 |
| 2,627,717 | Waller | Feb. 10, 1953 |
| 2,654,217 | Rettaliata | Oct. 6, 1953 |

FOREIGN PATENTS

| 717,711 | Germany | Feb. 21, 1942 |
| 622,053 | Great Britain | Apr. 26, 1949 |